US005355677A

United States Patent [19]
Hawkins et al.

[11] Patent Number: 5,355,677
[45] Date of Patent: Oct. 18, 1994

[54] METHOD OF OPERATING A SUPERCHARGED METHANOL FUELED DIESEL CYCLE INTERNAL COMBUSTION ENGINE

[75] Inventors: Jeffery S. Hawkins, Burbank, Calif.; Stanley P. Miller, Northville, Mich.; Craig L. Savonen, Carlton, Mich.; Steven M. Weisman, Farmington Hills, Mich.; David P. Tasky, Auburn Hills, Mich.; Richard E. Winsor, Birmingham, Mich.

[73] Assignee: Detroit Diesel Corporation, Detroit, Mich.

[21] Appl. No.: 108,313

[22] Filed: Aug. 18, 1993

Related U.S. Application Data

[62] Division of Ser. No. 757,720, Sep. 10, 1991, Pat. No. 5,269,144.

[51] Int. Cl.$^5$ ............................................. F02B 37/04
[52] U.S. Cl. ........................................ 60/609; 123/564
[58] Field of Search ........................ 60/602, 609, 611; 123/564

[56] References Cited

U.S. PATENT DOCUMENTS

| | | |
|---|---|---|
| 1,025,559 | 5/1912 | Bliss . |
| 3,568,435 | 3/1971 | May . |
| 4,394,481 | 7/1983 | Mezger . |
| 4,502,283 | 3/1985 | Wandel ............................. 60/609 |
| 4,539,948 | 9/1985 | Toepel ............................. 123/564 |
| 4,730,457 | 3/1988 | Yamada et al. .................... 60/609 |
| 4,738,110 | 4/1988 | Tatomo ............................ 60/609 |
| 4,883,041 | 11/1989 | Mochizuki ....................... 123/564 |
| 4,995,347 | 2/1991 | Tate et al. ...................... 123/65 BA |
| 5,154,155 | 10/1992 | Ohnaka et al. .................... 123/564 |

FOREIGN PATENT DOCUMENTS 28716 2/1986 Japan ............................. 123/564
291729 12/1986 Japan .

OTHER PUBLICATIONS

SAE Technical Paper Series 831744; Development of Detroit Diesel Allison 6V-925A Methanol Fueled Coach Engine; R. R. Toepel, J. E. Bennethum, R. E. Heruth.

SAE Technical Paper Series 861110; DDECII Advanced Electronic Diesel Control; Richard J. Hames, David L. Hart, Gregory V. Gillham, Steve M. Weisman, Bernd E. Peitsch.

Primary Examiner—Michael Koczo
Attorney, Agent, or Firm—Brooks & Kushman

[57] ABSTRACT

The combination of an intake air supply system with an internal combustion engine having a charge air cooler, a cylinder charging air intake and an exhaust discharge is provided. The intake air supply system includes a Roots-type positive displacement blower having inlet and outlet means and an exhaust gas driven turbo-compressor connected in series with the blower. The intake air supply system further includes a bypass passage connecting the blower inlet and outlet and a valve in the bypass passage to control the flow of fluid through the bypass. The valve is operative to open and close the bypass passage in response to engine operating parameters and to modulate the flow area of the passage in response to the same engine operating parameters so as to infinitely vary the flow area between the open and closed positions of the valve. The valve is modulated to operatively maintain the bypass passage at least partially open at engine idle, whereby the valve means permits bypass flow to recirculate air flow from the blower outlet to the inlet to reduce or limit the engine power absorbed by the blower or to conduct additional air flow around the blower directly from the turbo-compressor to the engine intake to avoid the restriction of the blower to increased charging air flow. A single valve means thus provides a dual function capability.

3 Claims, 9 Drawing Sheets fig-1a fig-1b fig-1c fig-1d fig-2 fig-4 fig-5a fig-5b fig-6 fig-7

METHOD OF OPERATING A SUPERCHARGED METHANOL FUELED DIESEL CYCLE INTERNAL -COMBUSTION ENGINE

This is a divisional of copending application(s) Ser. No. 07/757,720 filed on Sep. 10, 1991, U.S. Pat. No. 5,269,144.

TECHNICAL FIELD

The present invention is related to methanol fueled internal combustion engines, and, more particularly, to two-cycle compression-ignition engines.

BACKGROUND ART

Conventional compression-ignition (CI) engines in use today for vehicular and other industrial uses are fueled by a high grade fuel oil known as "No. 1 or No. 2 grade" and as "diesel fuel." It is a petroleum based fuel, high in hydrocarbons, has good lubricity characteristics which assists in lubricating the injectors and other moving parts exposed to the fuel prior to its being introduced into the combustion chamber, and is ignitable with or without the assist of a glow plug at relatively low geometric compression ratios ranging up to as much as 19:1.

However, with the advent of concern over reducing nitrogen oxides, particulates, highly reactive hydrocarbons and other combustion by-product emissions into the environment, there has been increased design effort in maximizing the emission characteristics of this fuel. Some have been cost effective (i.e. higher performance and greater thermal efficiencies), while others have not (i.e. the addition of particulate traps).

Coincident with these emission concerns, has been the concern of petroleum-based fuel shortages and the need for alternative fuel sources. Among the alternatives considered are low cetane liquid fuels, such as methanol and ethanol, as well as low cetane gases, such as natural gas.

Methanol is a particularly attractive fuel alternative since it is a liquid fuel, therefore, compatible with known liquid fuel systems. Additionally, methanol is a by-product of natural gas, an abundant energy resource. The special properties of methanol, however, require major engineering changes in engine design and the design of the air supply and fuel systems, just to name a few.

U.S. Pat. No. 4,539,948, issued to Toepel and assigned to the assignee of the present invention, describes an internal combustion engine of the two-cycle compression-ignition type for handling methanol fuels whereby the scavenging, i.e. clearing the exhaust gases from the combustion chamber immediately following combustion, is controlled so as to allow a certain amount of hot residual gases to remain in the combustion chamber to support and promote the auto-ignition of the methanol fuel during the next power cycle.

U.S. Pat. No. 4,502,283, issued to Wandel and assigned to the assignee of the present invention, discloses an automatically actuated valving arrangement for routing the engine blower discharge air through a bypass of the combustion chamber-cylinder liner air box upon the sensing of a particular air pressure. Thus, the full air delivery capacity of the blower is either fully utilized in assisting the combustion process, or completely removed therefrom.

U.S. Pat. No. 4,738,110, issued to Tateno, discloses a diesel engine equipped with a mechanically driven charger. The engine comprises an exhaust-gas driven turbocharger, a mechanically driven charger positioned in the engine intake passage, connection control means for controlling the mechanical connection between the mechanically driven charger and the engine, a bypass passage connected to the intake passage downstream of the charger and valve means controlling a bypass air flow within the bypass passage. The engine further includes control means for controlling the connection control means and the valve means in response to output signals from a plurality of detecting means for detecting starting and operation of the engine.

U.S. Pat. No. 4,394,812, issued to Mezger, discloses a supercharged internal combustion engine for motor vehicles. The engine has an exhaust gas turbine driven supercharging blower, exhaust gas bypass for regulating the exhaust gas turbine by diverting exhaust gases around the turbine and a blow-off valve control charging air bypass for circulating charging air supplied from the blower. The engine also has a second charging air bypass for circulating a portion of the air supplied by the blower therearound in response to at least one engine operating parameter so as to provide protection against excess charging pressure. The at least one engine parameter includes engine speed and/or charge pressure. A solenoid valve controlled by a safety switch may be utilized to control opening of the second bypass.

Despite these prior efforts, until the present invention, there was no two-cycle CI engine in use, fueled solely by methanol or any other low cetane liquid fuel. Despite the knowledge represented by the above-mentioned prior art, and other expertise in the field, there were many problems to be overcome for the successful long-range CI engine having satisfactory durability and performance. The present invention is directed to those major remaining concerns.

SUMMARY OF THE INVENTION

It is therefore an object of the present invention to provide a turbocharged and aftercooled blower-assisted two stroke combustion-ignition engine having the means to automatically modulate the amount of input air admitted to the combustion air box from a blower during engine operation throughout all engine load conditions and over the entire speed range of the engine.

The invention further contemplates the aforementioned objective whereby the primary feedback parameters upon which the modulation is based are turbocharger boost pressure, throttle position, and engine speed and the secondary feedback parameters may include engine coolant temperature and barometric pressure.

The invention further contemplates the above mentioned objective being used as a means of maintaining within the combustion chamber, from one combustion cycle to the next, sufficient high temperature residual exhaust gases capable of absorbing the cooling down effect of the relatively large volume of methanol fuel required to produce the power equivalent to the diesel-fueled engine while ensuring auto ignition of the compressed fuel air charge at all operating speeds and load conditions.

The invention further contemplates an automatically continuously modulated bypass blower control system in combination with an ultra high geometric compression ratio in the order of 23:1 which will assure auto ignition of the fuel air mixture compressed charge at all engine speeds and load conditions and limit the use of glow plug ignition enhancement to a duty cycle limited to start-up and warm-up and preclude the need for fuel-based ignition enhancers.

In carrying out the above objects, the combination of an intake air supply system with an internal combustion engine having a charge air cooler, a cylinder charging air intake and an exhaust discharge is provided. The intake air supply system includes an engine driven positive displacement blower having inlet and outlet means and an exhaust gas driven turbo-compressor connected in series. The compressor discharges to the blower inlet and the blower outlet discharges to the charge air cooler and to the engine air intake. The intake air supply system further includes a bypass passage connecting the blower inlet and outlet and a control valve means in the bypass passage to control the flow of fluid through the bypass. The control valve means is operative to fully open and fully close the bypass passage in response to continually sensed engine operating parameters and to modulate the flow area of the passage in response to the same engine operating parameters so as to infinitely vary the flow area between the fully open and fully closed positions of the control valve means. The control valve means is modulated to operatively maintain the bypass passage at least partially open at engine idle, whereby the control valve means permits bypass flow either (a) to recirculate air flow from the blower outlet to the inlet to reduce or limit the engine power absorbed by the blower or (b) to conduct additional air flow around the blower directly from the turbo-compressor to the engine intake to avoid the restriction of the blower to increased charging air flow. A single control valve means thus provides a dual function capability.

The above objects and other objects, features and advantages of the present invention are readily appreciated by one of ordinary skill in the art from the following detailed description of the best mode for carrying out the invention when taken in connection with the accompanying drawings.

BEST MODE FOR CARRYING OUT THE INVENTION

As is known, a methanol fueled two-cycle compression-ignition (CI) engine is an internal combustion engine in which the energy of methanol is converted into work. In this methanol engine, air alone is compressed in the cylinder. After the air is compressed, a metered amount of fuel is injected into the cylinder and ignition is accomplished by the heat of compression. Glow plugs are used to aid starting and engine warm-up.

The Two-Cycle Principal

Referring now to FIGS. 1a–1d, there is shown a timed sequence operation of a turbocharged and aftercooled two-cycle engine. During operation of the engine, intake and exhaust occurs during part of the compression and power strokes.

Intake air is boosted in pressure and temperature when passing through the turbocharger compressor and on to the blower 37, which is used to force air through an aftercooler and into the cylinders 16, expelling the exhaust gases and providing fresh air for combustion. The cylinder liner contains a row of ports 30 disposed therein so as to be above the piston 17 when the piston is at the bottom of its stroke. These ports admit air from the airbox into the cylinder as soon as the piston uncovers them during its downward stroke.

Figure 1A:
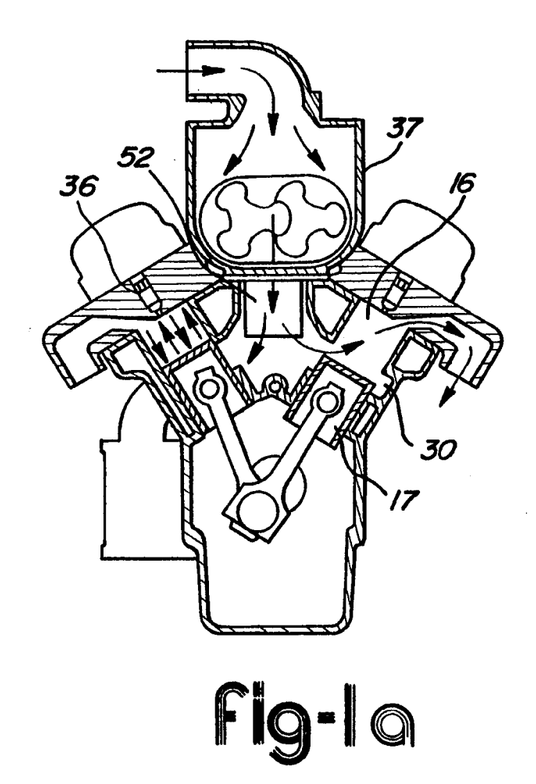
FIGS. 1a–1d are pictorial representations of the various operating cycles of a two-cycle compression-ignition engine in accordance with a conventional practice and being a part of the prior art.

The air flows generally toward the exhaust valves and removes most of the burned exhaust gases from the previous stroke, thereby leaving the cylinder with a mixture of fresh air and burned exhaust gases as the piston again covers the ports 30 during its upward movement, as best shown in FIG. 1a. This portion of the piston stroke is commonly referred to as the scavenging portion.

It is important to note, however, that some quantity of burned gases will remain in the cylinder and add heat to the next charge of incoming air. While this may seem, at first, to be inefficient, it is necessary for proper engine operation on methanol fuel. It is also important to note the heating or cooling effect of the aftercooler 52 immediately downstream of the blower 37. High load performance and durability of the engine is enhanced by the low temperature charge air that leaves the aftercooler. Conversely, at light loads, the heating effect of the aftercooler is important to maintaining auto-ignition of the methanol fuel.

Figure 1B:
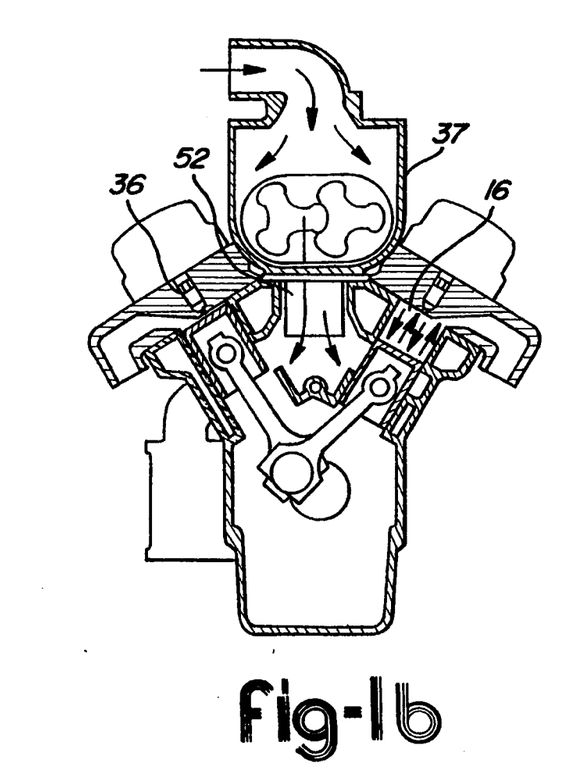

As the piston 17 continues on its upward stroke, the exhaust valves close and the mixture is compressed, creating heat, as best shown in FIG. 1b. This portion of the piston stroke is commonly referred to as the compression portion.

Figure 1C:
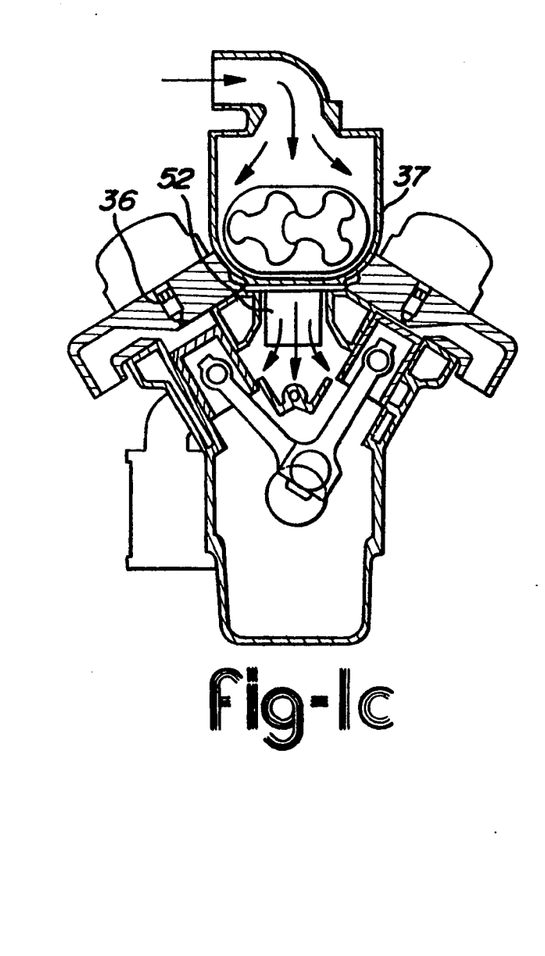

Shortly before the piston reaches "top dead center," a metered amount of fuel is preferably injected into the cylinder 16 by the fuel injector 36. The heat generated during compression ignites the fuel, causing combustion and forcing the piston downward so as to create power, as best shown in FIG. 1c. This portion of the piston stroke is commonly referred to as the power portion. As the piston moves downward on the power stroke, the combustion continues until all the fuel injected into the cylinder 16 has been burned.

Figure 1D:
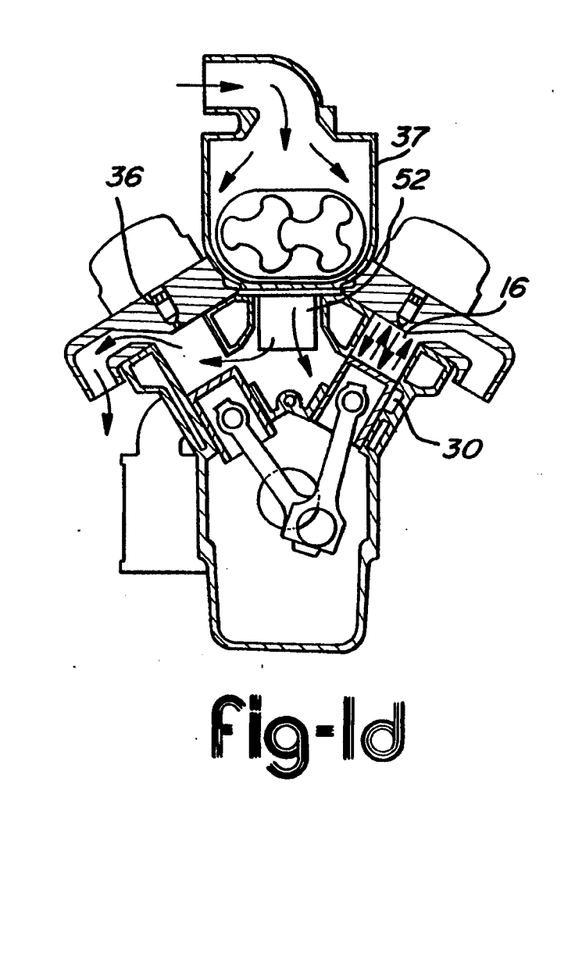

When the piston is about halfway down, the exhaust valves are opened so as to allow the burned gases to escape into the exhaust manifold. Shortly thereafter, the piston 17 uncovers the inlet ports 30 and fresh air from the blower 37 is again admitted into the cylinder 16, as best shown in FIG. 1d. This portion of the piston stroke is commonly referred to as the exhaust portion of the stroke.

As is known, the entire combustion cycle as described above is completed in each cylinder for each revolution of the crankshaft, or, in two strokes. Thus, the engine is a "two-stroke cycle" engine.

The Invention

Figure 2:
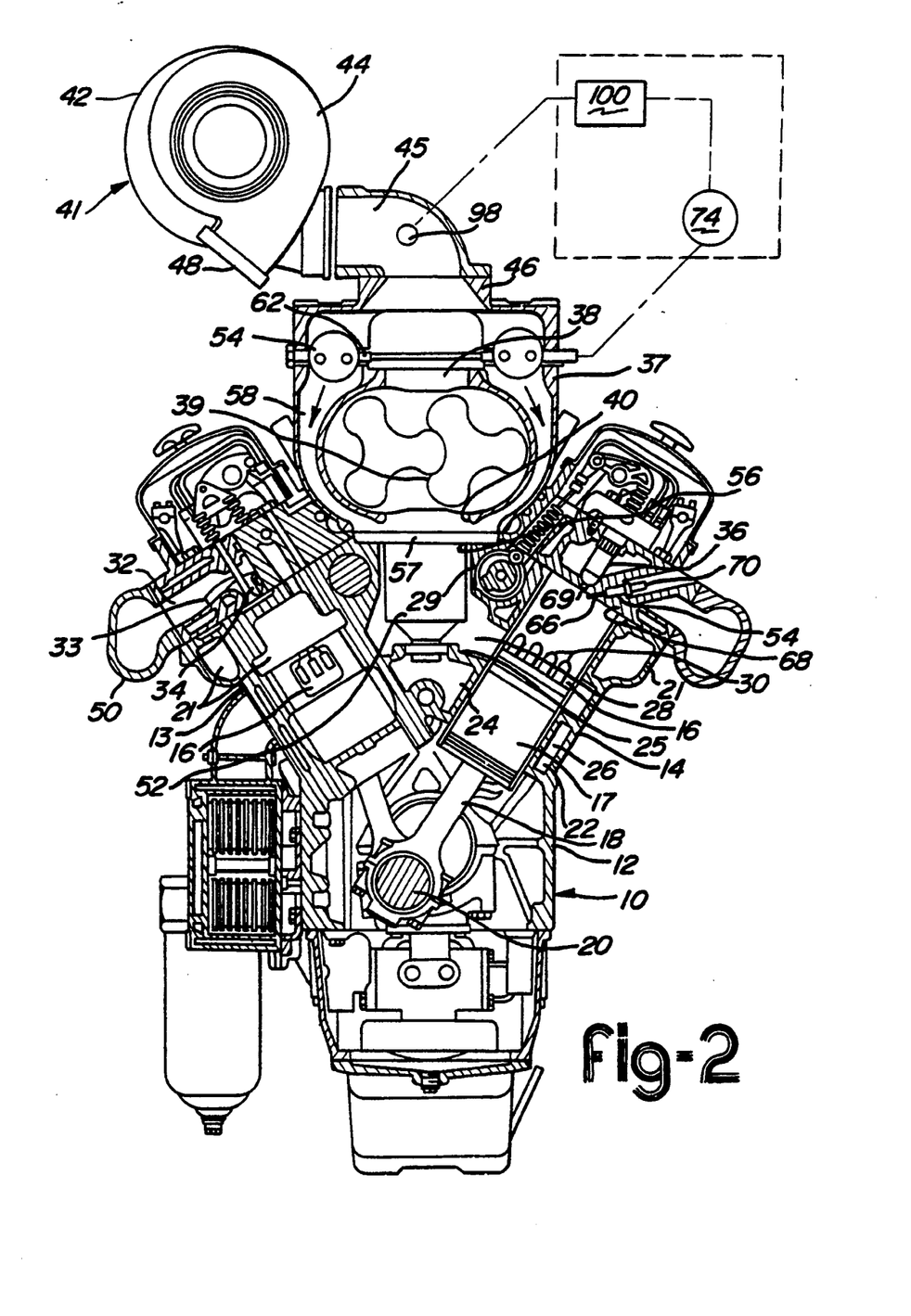
FIG. 2 is a transverse cross-sectional view of a two-cycle diesel engine adapted for methanol operation in accordance with the invention.

Referring now to FIG. 2, there is shown an engine generally indicated by reference numeral 10, of the multi-cylinder two-cycle diesel type. Engine 10 includes a cast cylinder block and crankcase 12 having a pair of cylinder banks 13 and 14 arranged in a "V". Each cylinder bank is provided with a plurality of longitudinally aligned cylinders 16. A plurality of pistons 17 are reciprocally disposed, one in each cylinder, and connect through connecting rods 18 with a crankshaft 20, which is rotatably supported in conventional fashion in the lower crankcase portion of the block 12.

The cylinder block further defines upper and lower coolant jackets 21 and 22 which respectively extend around the upper and lower portions of the cylinders and are interconnected for coolant flow therebetween. The central portion of the lower coolant jacket 22 extends between the cylinder banks to form a longitudinally extending central chamber 24, closed by an upper wall 25. The cylinder block also defines an inlet air chamber, or air box 26, outer portions of which extend around the centers of each of the cylinders between the upper and lower coolant jackets. An open central plenum 28 extends above wall 25 and connects the air box outer portions to an opening 29 in the top of the cylinder block between the two cylinder banks. Ports 30 are provided around the central portions of the cylinders to permit air to flow into the cylinders from the air box 26 as controlled by the motion of the pistons 17, as described above.

Each cylinder bank is preferably provided with a cylinder head 32 mounted to close the upper ends of the cylinders of its respective bank and containing a plurality of exhaust valves 33, exhaust passages 34 controlled by the valves, and a fuel injector 36 for each cylinder. Actuation of the valves and injectors is conventionally controlled by valve gear operated in timed relation with the engine crankshaft.

In the preferred embodiment, a glow plug 60 is mounted in each of the engine cylinder heads 32. The glow plugs are of conventional construction and include a tip portion 66 which extends into each engine cylinder 16 within the bowl (not specifically illustrated) formed in the head of its associated piston 17 (at its top dead center position) and near the tip 69 of the associated fuel injector 36. The glow plugs 60 are connected through an electrical contact 70 with conventional means (not specifically illustrated) for energizing and controlling operation of the glow plugs as required.

A Roots-type positive displacement blower 37, sometimes referred to as the bypass blower, is preferably centrally mounted on the cylinder block between the engine cylinder heads. Blower 37 has an inlet opening 38 in the upper portion of its housing, a plurality of lobed impellers 39 working in an enlarged central portion, and an outlet opening 40 in the lower portion of its housing and with the aftercooler 52 positioned within the air box inlet opening 29 of the cylinder block.

With continuing reference to FIG. 2, a turbocharger 41 is shown to be mounted on the engine 10 in a known fashion and includes a dynamic compressor portion 42 and a turbine portion 44. The compressor portion 42 has an air inlet (not specifically illustrated) adapted to be connected with an air source and an air outlet 45 connected by an air horn 46 with the inlet 38 of the blower 37. The turbine portion 44 includes an outlet (not specifically illustrated) and an inlet 48 connected by suitable conduit with exhaust manifolds 50 mounted on the engine cylinder heads and connecting with the exhaust passages 34 thereof.

Aftercooler 52 is received within the central plenum 28 of the engine air box. The aftercooler 52 is preferably supported within the cylinder block by a flange 56 secured within a recess 57 provided around the edge of the air box inlet opening 29. The aftercooler directs air delivered by the blower 37 through vertical passages (not specifically illustrated) in heat exchange relation to the engine coolant and directly into the central plenum 28 of the air box 26.

The foregoing is further described in U.S. Pat. No. 4,539,948, the subject matter of which is herein incorporated by reference.

In the preferred embodiment, the Roots blower 37 is provided with a plurality of bypass passages 58 that extend within the blower housing around respective sides of the central portion containing the impellers 39. The passages 58 thus provide an alternate flow path around the impellers from the air horn 46 leading from the turbocharger compressor to the aftercooler 52.

Figure 3:
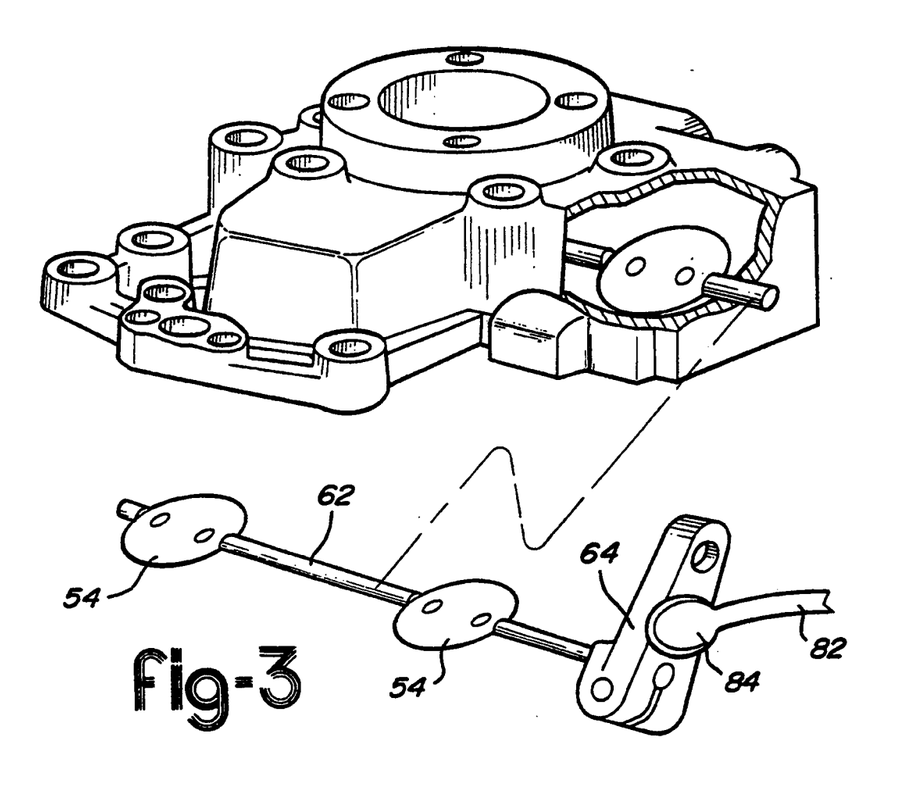
FIG. 3 is a exploded perspective view of the bypass blower inlet housing, or "air horn," as it is conventionally known, in accordance with the present invention.

As best shown in FIG. 3, a blade-type control valve or bypass valve 54 is generally located at the entrance of each passage 58 within the air horn 46 so as to control air flow through each bypass passage 58. Each valve 54 is preferably affixed to a common control shaft 62 rotatably supported by the air inlet housing or air horn 46. A rocker arm 64 serves to rotate the shaft 62 such that the passages 58 are closed or opened by the oscillating movement of the respective control valve 54.

Figure 4:
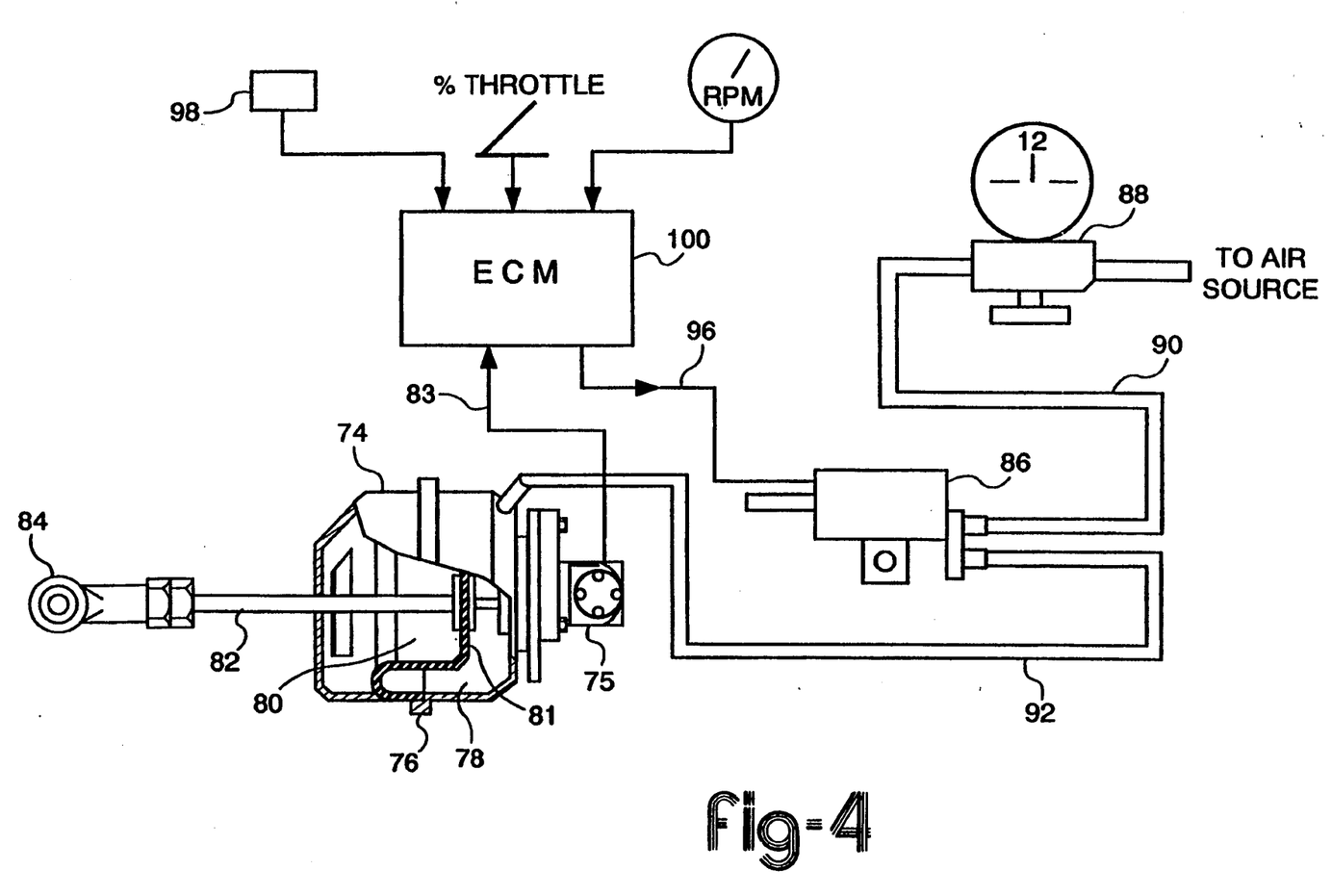
FIG. 4 is a block diagram of the hardware associated with the bypass blower control system according to the present invention.

Referring to FIG. 4, it can be seen that the bypass actuator 74 is pneumatically actuated. Preferably, the actuator 74 includes a flexible diaphragm 81 radially outwardly sealed to the housing member 76, so as to divide the actuator 74 generally into two chambers 78 and 80. A piston stem 82 is affixed to the central portion of the flexible diaphragm 81. The chamber 80 is open to ambient pressures and the chamber 78 receives air under pressure in varying amounts from solenoid valve 86, which controls the amount of air flowing from a pressurized air source, not specifically illustrated, through regulator 88 and air hoses or lines 90 and 92 to the bypass actuator 74.

As best shown in FIG. 3, the piston stem 82 preferably includes a ball-in-socket end 84, which is pivotally connected to the valve rocker arm 64. The ball-in-socket end 84 further includes a spring member (not specifically shown) which operates to constantly urge the piston stem 82 in the direction of the housing member 76 and, therefore, the bypass valves 54 to a position wherein the passages 58 are fully closed.

With continuing reference to FIG. 4, the solenoid valve 86 is preferably controlled by an electronic control module (ECM) 100 via line 96. Thus, when the solenoid valve 86 is energized, air enters the actuator 74, the chamber 78 is filled and the flexible diaphragm 81 is urged outward. This in turn moves the piston stem 82 outward from the actuator 74, so as to rotate the rocker arm 64 and, therefore, the bypass valves 54. The actuator 74 includes a potentiometer 75 for detecting the actual position of the actuator 74 (i.e. the piston stem 82) and generating a feedback signal which is supplied to the ECM 100 via line 83, thereby providing accurate feedback bypass blower control.

As shown in FIG. 2, the ECM 100 preferably receives input from a turbocharger compressor outlet pressure sensor 98 located in the outlet 45 of the turbocharger 41. This measure of the turbocharger's boost to the air inlet charging system is, of course, only one of a number of engine parameters sensed and fed to the ECM 100. The ECM 100 also receives sensory inputs relating to the throttle position and engine speed from sensors (not specifically illustrated).

In the preferred embodiment, the ECM 100 is a Detroit Diesel Electronic Controller (DDEC) II and includes a microprocessor, RAM-type memory, EPROM-type memory and analog-to-digital (A/D) circuitry. As is known, the microprocessor performs calculations, the RAM memory is useful for storing data and the like, the EPROM is useful for storing the software which controls engine and bypass blower operation and the A/D circuitry converts analog signals from sensors into corresponding digital data.

Figure 5A:
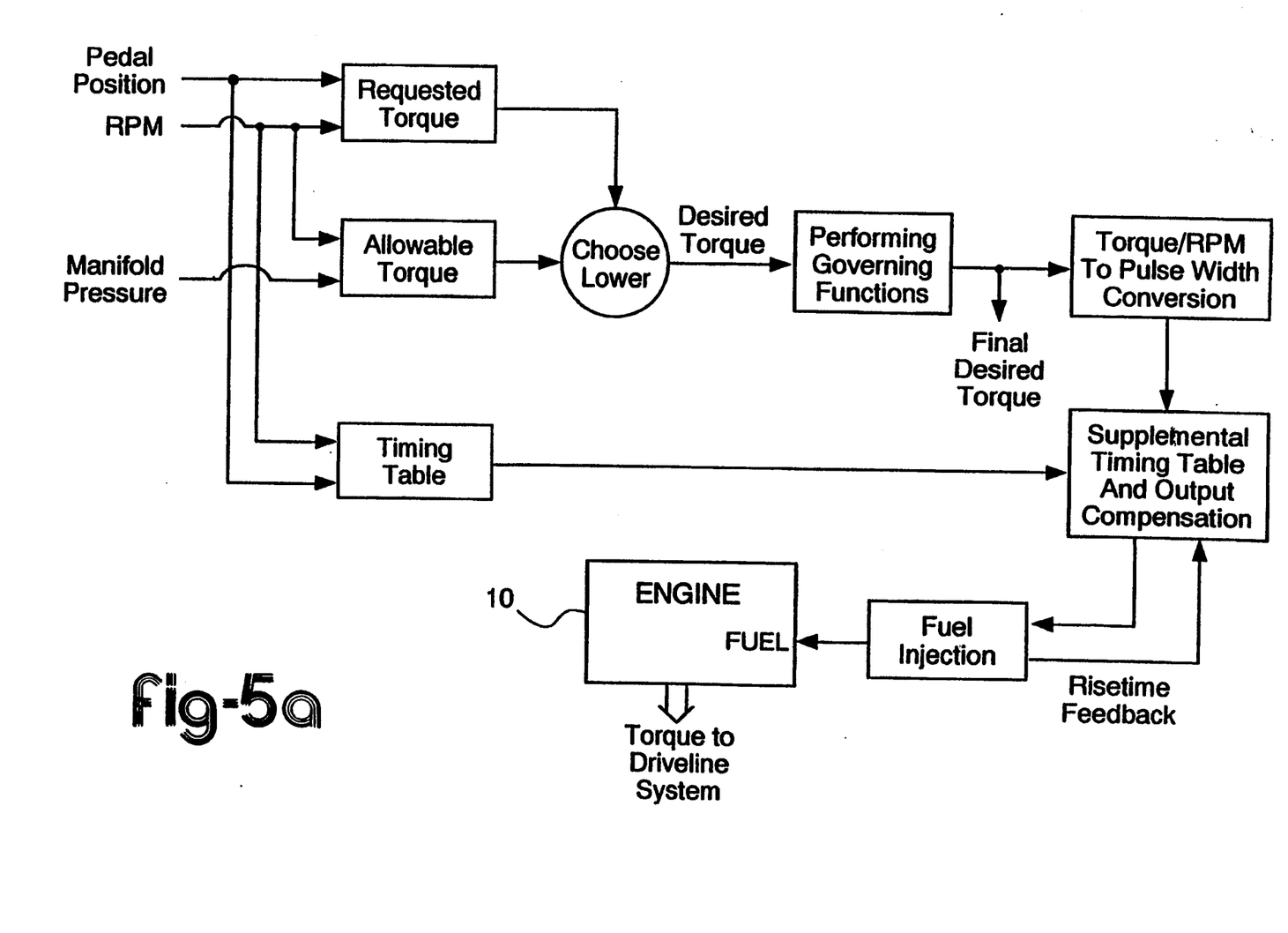
FIG. 5a is a block diagram of the fuel control strategy for use with the present invention.

Referring now to FIG. 5a, the ECM 100 controls fuel delivery to the engine 10. Based on throttle position and engine speed, the microprocessor retrieves a corresponding "requested torque" value from a torque table stored in the EPROM and also retrieves beginning-of-injection timing data from timing tables stored in the EPROM. Similarly, the microprocessor utilizes engine speed and manifold pressure data to retrieve a corresponding "allowable torque" from a separate table also stored in the EPROM. The requested torque and the allowable torque are then compared and the lower of the two is selected as the "desired torque".

The microprocessor then determines if any governing functions need to be performed. These governing functions could include idle speed governing, high-speed governing, or the like and modify the desired torque into a "final desired torque", which is stored in the RAM.

The microprocessor then determines the proper pulse width for the fuel injectors as a function of the final desired torque and the engine speed from a conversion table stored in the EPROM. Next, the microprocessor utilizes supplemental injector timing tables and performs output compensation based on the individual injector risetime, which is fedback to the ECM 100.

Figure 5B:
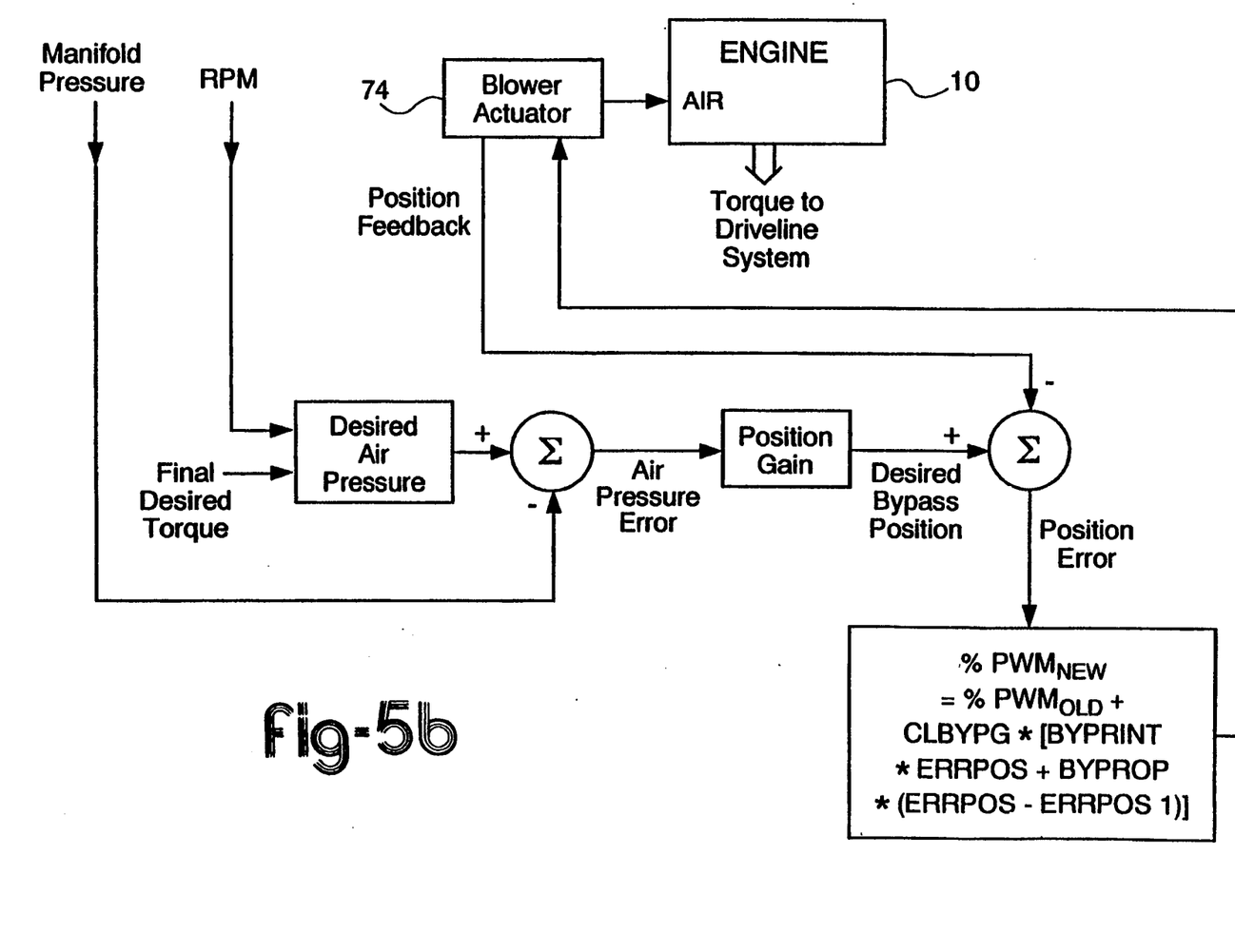
FIG. 5b is a block diagram of the bypass blower control system for use with the present invention.

Turning now to FIG. 5b, there is shown a block diagram of the bypass blower control system. In addition to controlling fuel delivery to the engine as discussed above, the ECM 100 also provides bypass blower control according to the flow chart shown in FIG. 6.

Figure 6:
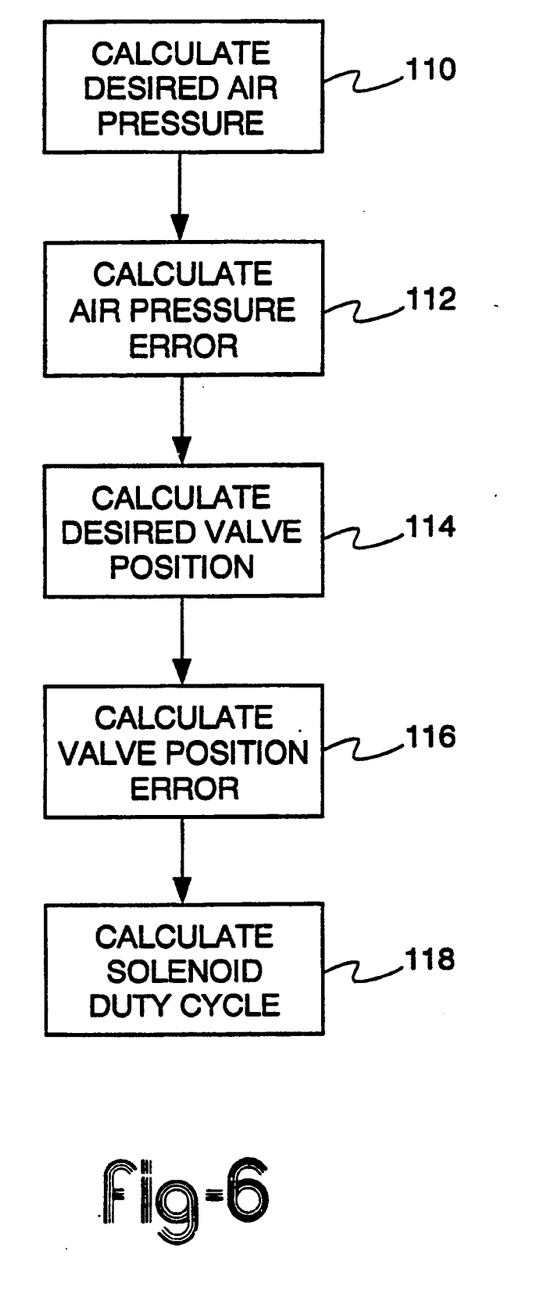
FIG. 6 is a flowchart illustrating the method of controlling the bypass blower of the present invention.

At step 110, a desired air pressure (DESKPA) is preferably retrieved by the microprocessor from a table stored in the EPROM. The DESKPA value is preferably a function of the engine speed and the final desired torque. Next, the error in the compressor pressure (ERRKPA) is calculated at step 112 as follows:

$$ERRKPA = DESKPA - ACTKPA$$

wherein ACTKPA is the actual manifold pressure as sensed by the turbocharger compressor boost sensor 98.

At step 114, the desired position (DESPOS) of the bypass valves 54 are determined by the microprocessor as follows:

$$DESPOS = BYPGAN \cdot ERRKPA$$

wherein BYPGAN represents the air pressure to valve position gain.

At step 116, the microprocessor next determines the error in the valve position (ERRPOS) according to the following equation:

$$ERRPOS = DESPOS - BYPPOS$$

wherein BYPPOS represents the scaled bypass valve position. As noted above, the bypass valve position is preferably determined utilizing position feedback.

Having calculated the desired valve position and determined the actual valve position, the microprocessor next controls the bypass valve position toward the desired position by adjusting the pulse width modulation of the solenoid valve 86 at step 118, as described in greater detail above, according to the following equation:

$$\% PWM_{NEW} = \% PWM_{OLD} + CLBYPG \cdot [BYPINT \cdot ERRPOS + BYPROP \cdot (ERRPOS - ERRPOS1)]$$

wherein % $PWM_{NEW}$ represents the adjusted solenoid percent duty cycle (between the upper and lower limits), % $PWM_{OLD}$ represents the previous solenoid percent duty cycle, CLBYPG represents the valve 54 position loop gain, BYPINT represents the valve position integral gain, BYPROP represents the position proportional gain and ERROS1 represents the previous position error.

In accordance with the invention, use of the control strategy discussed above allows the bypass valve to have an infinite number of positions within the passages 58, thereby allowing the ECM 100 to maintain the scavenge ratio, scavenge efficiency and trapping efficiency within predetermined limits during engine operation, as described in greater detail herein below.

Scavenge ratio is a term commonly used in the art of two-stroke engines and is defined as the ratio of overall fresh air mass delivered to the ideal air mass to fill the cylinder at air box conditions. For a given engine displacement, scavenge ratio is proportional to overall air flow per cycle, divided by the density of the air in the air box. Scavenge ratio combines several parameters, namely air flow, rpm, and air box temperature and pressure, into one term which is readily calculated from data directly obtainable in a test cell.

Scavenge efficiency can be defined as the ratio of fresh air delivered and trapped to fresh air delivered and trapped plus residual gases. In other words, it is important that the fresh incoming air not sweep completely the exhaust gases from the combustion chamber, but rather leave a certain amount of exhaust gases in the combustion chamber so that the residual heat of these exhaust gases will heat the total air mixture being compressed to a final compression temperature sufficient to withstand the evaporation effects of the fuel being ejected and to automatically ignite the methanol fuel charge without the assistance of a glow plug 60 or other ignition enhancements.

Trapping efficiency is also a term commonly used and can be defined as being the ratio of the fresh air delivered and trapped to the fresh air delivered. In accordance with the invention, there is listed in Tables I and II the typical range and the preferred values for the scavenge ratio, scavenge efficiency and trapping efficiency at peak torque and peak load, respectively.

TABLE I

| PEAK TORQUE (@ 1200 RPM) | | |
|---|---|---|
| | Range | Preferred |
| Scavenge Ratio | 0.7–1.0 | 0.9 |
| Scavenge Efficiency | 70%–90% | 87% |
| Trapping Efficiency | 65%–75% | 72.5% |

TABLE II

| PEAK LOAD (@ 2100 RPM) | | |
|---|---|---|
| | Range | Preferred |
| Scavenge Ratio | 0.4–0.6 | 0.5 |
| Scavenge Efficiency | 60%–80% | 75% |
| Trapping Efficiency | 80%–90% | 84% |

Figure 7:
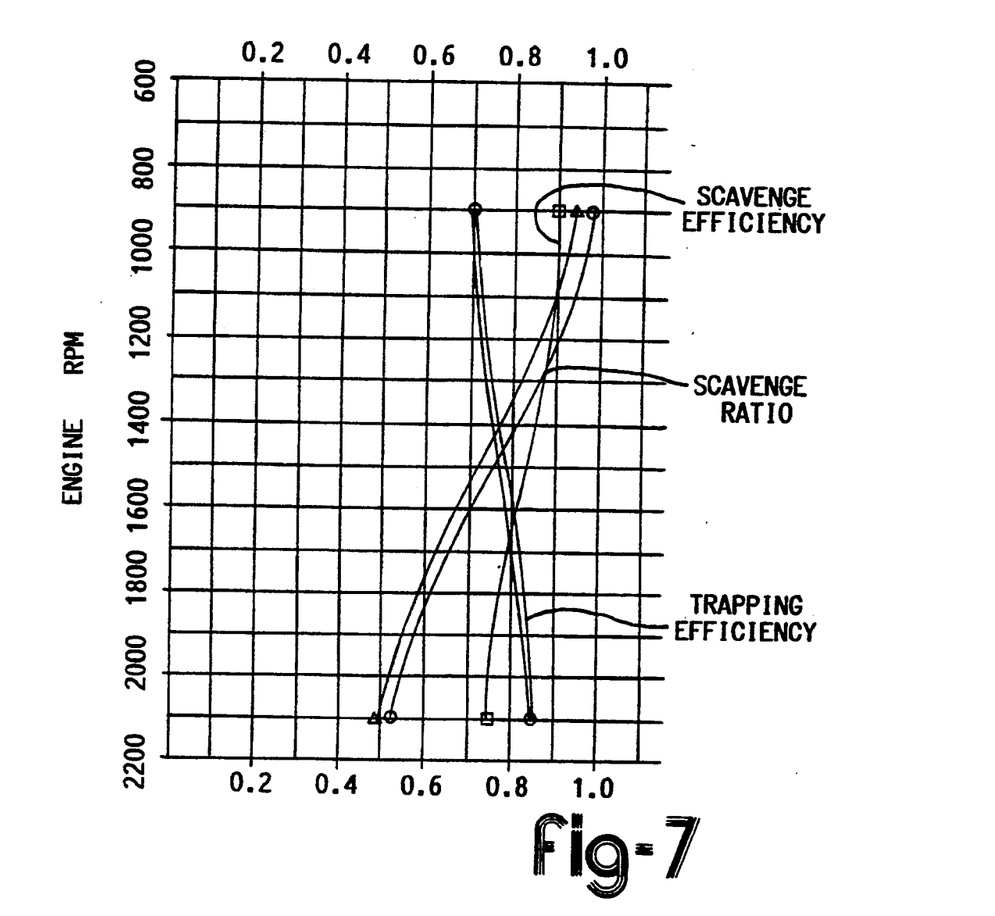
FIG. 7 is a graphic illustration of the relationship between scavenge ratio, scavenge efficiency and trapping efficiency in accordance with the present invention.

Referring now to FIG. 7, the general relationship between scavenge ratio, scavenge efficiency and trapping efficiency are illustrated for the methanol engine of the preferred embodiment. As shown in FIG. 7, as engine RPM increases, the trapping efficiency generally increases while the scavenging efficiency and scavenging ratio generally decrease.

It has been determined that the aforementioned predetermined engine operating parameters can be produced by utilizing a preferred developed schedule for the degree to which the bypass valves 54 must be opened during steady state speed and load conditions. This schedule is presented in Table III below.

TABLE III

| | TQ (NM) | | | | | | | | |
|---|---|---|---|---|---|---|---|---|---|
| | 0 | 150 | 300 | 450 | 600 | 750 | 900 | 1050 | 1200 |
| | | | | | % Max TQ | | | | |
| rpm | 0 | 12.5 | 25.0 | 37.5 | 50.0 | 62.5 | 75.0 | 87.5 | 100 |
| 600 | 40 | 40 | 50 | 70 | 100 | 100 | 100 | 100 | 100 |
| 900 | 40 | 45 | 50 | 100 | 100 | 100 | 100 | 100 | 100 |
| 1200 | 40 | 50 | 70 | 100 | 100 | 100 | 100 | 100 | 100 |
| 1500 | 40 | 50 | 70 | 80 | 75 | 70 | 65 | 60 | 60 |
| 1800 | 40 | 50 | 65 | 65 | 65 | 60 | 00 | 00 | 00 |
| 2100 | 40 | 50 | 60 | 60 | 60 | 40 | 00 | 00 | 00 |

The values listed in Table III represent the percent closed angular positions of the valves 54 in the passage. Thus, "100" represents a substantially horizontal valve position within the passage, "0" represents a substantially vertical valve position within the passage and "50" represents a generally 45° valve position within the passage. The valve positions are continually monitored, adjusted and optimized for performance, durability and transient emission cycles by the ECM 100 in accordance with the general formula of:

$$VALVE_{POS} - (Table\ IV\ Value - Boost) * Gain$$

The Table IV value is a control parameter based on steady state test cell conditions, calculated in terms of the $Valve_{POS}$ equation above wherein boost pressure is measured for various loads throughout the engine's speed range. The "gain" is preferably a fixed value stored in the ECM 100 and "boost" is measured by the sensor 98 in terms of air pressure at the turbocharger compressor outlet, as described above. It is a function of engine speed and load throughout position and time. In this way, the bypass calibration can be fine-tuned for any specific engine configuration. For the preferred engine, the resulting Table may appear as follows:

TABLE IV

| Resulting Bypass Table Values | | | | | | | | | |
|---|---|---|---|---|---|---|---|---|---|
| | % Max TQ | | | | | | | | |
| rpm | 0 | 12.5 | 25.0 | 37.5 | 50.0 | 62.5 | 75.0 | 87.5 | 100.0 |
| 600 | 119 | 119 | 126 | 140 | 161 | 166 | 172 | 178 | 188 |
| 900 | 119 | 124 | 130 | 161 | 167 | 175 | 183 | 194 | 207 |
| 1200 | 120 | 128 | 148 | 173 | 185 | 197 | 210 | 226 | 249 |
| 1500 | 121 | 137 | 156 | 172 | 183 | 194 | 209 | 227 | 251 |
| 1800 | 124 | 144 | 160 | 173 | 189 | 204 | 196 | 222 | 254 |
| 2100 | 127 | 149 | 164 | 180 | 199 | 211 | 203 | 238 | 279 |

Additionally, in accordance with the invention, the geometric compression ratio is maintained between 20:1 and 25:1. Geometric compression ratio is defined by the ratio of in-cylinder volume at the bottom-dead-center piston position divided by the in-cylinder volume at top-dead-center piston position. In the preferred embodiment, the geometric compression ratio is 23:1.

The result of maintaining a high geometric compression ratio while constantly monitoring and controlling the bypass blower within predetermined parameters so as to maintain the most efficient residual heat effect of the incoming and trapped air is to provide an extremely efficient, methanol fueled combustion-ignition engine utilizing glow plug ignition only at start-up and warm-up.

It is recommended to read SAE Technical Paper 86110, entitled "DDEC II Advanced Electronic Diesel Control" and authored by R. J. Hames, D. L. Hart, G. V. Gilliam, S. M. Weisman and B. E. Peitsch, published in connection with the West Coast International Meeting in Universal city, Calif. on Aug. 4–7, 1986, and hereby incorporated by reference for additional detail on the DDEC II electronic control module. It is also recommended to read SAE Paper No. 831744 entitled "Development of Detroit Diesel Allison 6-V92TA Methanol Fuel Coach Engine" by R. R. Toepel, J. E. Bennethum, and R. E. Heruth, published in conjunction with the Fuels and Lubricants Meeting held in San Francisco, Calif., on Oct. 31–Nov. 3, 1983 and hereby incorporated by reference.

An extensive discussion of the background, development, features and application of an operating embodiment of the invention is described and illustrated in SAE Paper No. 901564 entitled "Development Status of the Detroit Diesel Corporation Methanol Engine" by S. P. Miller and C. L. Savonen, published in conjunction with the International Off-Highway & Power Plant Congress and Exposition in Milwaukee, Wis. on Sep. 10–13, 1990. Reference to these papers is recommended for a detailed discussion of the subject matter described herein, and the disclosure of these papers are hereby incorporated by reference.

While the best modes for carrying out the invention have been described in detail, those familiar with the art to which this invention relates will recognize alternative designs and embodiments for practicing the invention. It should be understood that the words used are words of description rather than limitation, and that various changes may be made without departing from the spirit and scope of the invention as disclosed. Thus, the above described preferred embodiment is intended to be illustrative of the invention which may be modified within the scope of the following appended claims.

What is claimed:

1. In an intake air supply system for use with an internal combustion engine, the intake air supply system having a positive displacement blower and a turbo-compressor connected in series with the blower, the blower providing a bypass passage and a valve means supported in the passage, the valve means being operable by a solenoid-driven actuator to adjust the position of the valve means within the bypass passage to any one of a plurality of positions within a predetermined range, a method of adjusting the position of the valve means to any one of said positions so as to continuously modulate the flow area of said passage, the method comprising the steps of:

calculating the position of the valve means based on engine speed, air pressure downstream of the turbo-compressor at a particular point and operator demand;

the step of calculating the position of the valve means including the step of determining a desired air pressure based on engine speed and operator demand;

sensing an actual air pressure at the same particular point downstream of the turbo-compressor and comparing the actual air pressure to the desired air pressure to obtain a first error signal;

calculating a desired valve means position based on said first error signal and a multiplier associated with the desired air pressure;

generating a feedback signal representing the actual valve means position and a comparing the actual valve means position to the desired valve means position to obtain a second error signal;

calculating a duty cycle based on said second error signal; and energizing the solenoid based on the duty cycle, thereby controlling the position of the valve means in the passage and infinitely varying the flow area of said passage.

2. The method of claim 1 wherein the duty cycle is calculated utilizing a difference equation.

3. The method of claim 2 wherein the difference equation is $\% PWM_{OLD} = \% PWM_{NEW} + CLBYG * [BYPINT * ERRPOS + BYPROP * (ERRPOS - ERRPOS1)]$, wherein $\% PWM_{OLD}$ is the value of a previously calculated solenoid percent duty cycle, $\% PWM_{NEW}$ is the value of the adjusted solenoid percent duty cycle, CLBYPG is the value of the valve means position loop gain, BYPINT is the value of the valve means position integral gain, BYPROP is the value of the valve means position proportional gain, ERRPOS is the value of the current valve means position error and ERRPOS1 is the value of a previously calculated valve means position error.

* * * * *

UNITED STATES PATENT AND TRADEMARK OFFICE
Certificate

Patent No. 5,355,677                                                                   Patented: October 18, 1994

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Jeffery S. Hawkins, Burbank, Calif.; Stanley P. Miller, Northville, Mich.; Craig L. Savonen, Carlton, Mich.; Steven M. Weisman, Farmington Hills, Mich.; David P. Taksy, Auburn Hills, Mich.; Richard E. Winsor, Birmingham, Mich.; Michael J. Holihan, Farmington Hills, Mich.; and Raymond S. VanderBok, Saline, Mich..

Signed and Sealed this Fifth Day of August, 1997.

*TIMOTHY S. THORPE*
*Supervisory Patent Examiner*
Art Unit 3403

UNITED STATES PATENT AND TRADEMARK OFFICE
CERTIFICATE OF CORRECTION

PATENT NO. : 5,355,677
APPLICATION NO. : 08/108313
DATED : October 18, 1994
INVENTOR(S) : Hawkins et al.

It is certified that error appears in the above-identified patent and that said Letters Patent is hereby corrected as shown below:

On the Title Page

Item (75) Inventors, should read:
--Jeffery S. Hawkins, Burbank, CA (US); Stanley P. Miller, Northville, MI (US); Craig L. Savonen, Carlton, MI (US); Steven M. Weisman, Farmington Hills, MI (US); David P. Tasky, Auburn Hills, MI (US); Richard E. Winsor, Birmingham, MI (US); Michael J. Holihan, Farmington Hills, MI (US); Raymond S. VanderBok, Saline, MI (US)--.

This certificate supersedes the Certificate of Correction issued August 5, 1997.

Signed and Sealed this
Twentieth Day of August, 2019

Andrei Iancu
*Director of the United States Patent and Trademark Office*